(12) United States Patent
Nobile

(10) Patent No.: US 11,333,440 B2
(45) Date of Patent: May 17, 2022

(54) COMPACT THIN-FILM HEAT RECOVERY DEVICE FOR SHOWERS

(71) Applicant: John Richard Nobile, Guilford, CT (US)

(72) Inventor: John Richard Nobile, Guilford, CT (US)

( * ) Notice: Subject to any disclaimer, the term of this patent is extended or adjusted under 35 U.S.C. 154(b) by 2 days.

(21) Appl. No.: 17/113,811

(22) Filed: Dec. 7, 2020

(65) Prior Publication Data

US 2021/0172683 A1 Jun. 10, 2021

Related U.S. Application Data

(60) Provisional application No. 62/945,125, filed on Dec. 7, 2019.

(51) Int. Cl.
| | | |
|---|---|---|
| *F28D 7/02* | (2006.01) | |
| *F28D 7/10* | (2006.01) | |
| *F28D 21/00* | (2006.01) | |
| *F24D 17/00* | (2022.01) | |
| *F28F 13/08* | (2006.01) | |
| *F28D 7/00* | (2006.01) | |
| *E03C 1/00* | (2006.01) | |

(52) U.S. Cl.
CPC ........... *F28D 7/10* (2013.01); *F24D 17/0005* (2013.01); *F28D 7/0016* (2013.01); *F28D 7/024* (2013.01); *F28D 21/0012* (2013.01); *F28F 13/08* (2013.01); *E03C 2001/005* (2013.01)

(58) Field of Classification Search
CPC .... F28D 7/024; F28D 7/0016; F28D 21/0012; F28F 13/08; E03C 2001/005; F24D 17/0005
See application file for complete search history.

(56) References Cited

U.S. PATENT DOCUMENTS

| | | | | |
|---|---|---|---|---|
| 2,446,289 | A * | 8/1948 | Love | F28D 1/06 |
| | | | | 165/118 |
| 2,532,026 | A * | 11/1950 | Kellershon | F25D 31/002 |
| | | | | 62/391 |
| 2,577,574 | A * | 12/1951 | Freer | F25D 31/002 |
| | | | | 62/391 |
| 2,611,585 | A * | 9/1952 | Boling | F28D 7/0016 |
| | | | | 165/164 |
| 4,300,247 | A | 11/1981 | Berg | |

(Continued)

*Primary Examiner* — Eric S Ruppert

(74) *Attorney, Agent, or Firm* — Bryan D. Zerhusen, Esq.; Nicholas R. Herrel, Esq.; Cantor Colburn LLP

(57) ABSTRACT

A first conduit having a cylindrical upper entrance region with the axis of the cylindrical region oriented vertically, which accepts incoming downwardly flowing hot drain water, a central region of said first conduit below the said entrance region having a conical shape of increasing diameter, reaching a maximum diameter 2-7 times larger than the upper region, the shape then transitioning to a decreasing diameter area of a conical shape, the shape transitioning to a cylindrical lower region with a diameter similar to the upper region diameter; a second conduit for the flow of the shower cold water supply, with a diameter 10-40 times smaller than the maximum diameter of the drain water conduit, and a length 10-40 times longer than the vertical length of the drain water conduit, the second conduit tightly wrapped around the first conduit and in close thermal contact with the first conduit.

18 Claims, 14 Drawing Sheets

(56) References Cited

U.S. PATENT DOCUMENTS

| | | |
|---|---|---|
| 4,398,308 A | 8/1983 | Berg |
| 5,791,401 A | 8/1998 | Nobile |
| 7,849,530 B2 | 12/2010 | Hendricks |
| 7,849,730 B2 | 12/2010 | Yung et al. |
| 7,996,933 B2 | 8/2011 | McGregor |
| 8,104,532 B2 | 1/2012 | Cardone |
| 8,973,178 B2 | 3/2015 | Rusch |
| 9,651,310 B2 | 5/2017 | Melico |
| 9,777,932 B2 | 10/2017 | Hagman et al. |
| 10,006,645 B1 | 6/2018 | Howard |

\* cited by examiner

Schematic of Shower Heat Recovery System

Section B-B from FIG. 5

Shell and Coil Assembly 36

COMPACT THIN-FILM HEAT RECOVERY DEVICE FOR SHOWERS

CROSS-REFERENCE TO RELATED APPLICATIONS

This application claims the benefit of U.S. Provisional Application No. 62/945,125 filed Dec. 7, 2020, the disclosure of which is incorporated herein by reference in its entirety.

BACKGROUND

The disclosed embodiments relate generally to the field of heat exchangers, and more particularly to a compact thin-film heat recovery device for showers.

Showers of reasonable length and temperature typically consume less hot water than bathing in a tub. However, a substantial amount of the energy required to heat the water is lost down the drain, since the shower water remains in the shower installation for a very brief period of time, which generally is insufficient for the water to lose its heat. Further, the shower water is not generally comfortable if it cools below body temperature, therefore a shower system designed to use up the heat from the water while it is being used for showering is not a practical way to save energy. Allowing the heat energy to go down the drain is wasteful of energy, and represents an expense in the cost of fuel or electricity to heat the water which could be reduced if the heat lost in the waste water could be recaptured and put to use.

BRIEF SUMMARY

Disclosed is a fluid to fluid heat exchanger system comprising: a first conduit that extends from a first conduit top end along a first axis to a first conduit bottom end to define a first conduit length, the first conduit defining: an entrance region that extends along the first axis from the first conduit top end to an entrance region bottom end, wherein the entrance region defines a cylindrical shape having a first conduit entrance diameter, wherein the entrance region is configured to receive a first fluid flow substantially parallel to the first axis, into the heat exchanger system; a central region, extending axially downward along the first axis from the entrance region bottom end, wherein the central region defines: a central region top end at the entrance region bottom end; a central region diverging portion that extends axially downwardly, along the first axis and conically diverges from the central region top end to a central region intermediate portion, wherein the central region intermediate portion defines a first conduit central region diameter that is greater than the first conduit entry diameter; and a central region converging portion that extends axially downwardly along the first axis and conically converges from the central region intermediate portion end to a central region bottom end, the central region bottom end defining a first conduit exit diameter that is less than the first conduit central diameter; an exit region that extends along the first axis from the central region bottom end to the first conduit bottom end, wherein the exit region defines a cylindrical shape having the first conduit exit diameter; a second conduit defining a second conduit diameter that is smaller than the first conduit entrance diameter, and a second conduit length that is longer than the first conduit length, wherein the second conduit is helically wrapped about the first conduit central region, from the central region top end to the central region bottom end, wherein the second conduit contacts the first contact substantially continuously along its length, thereby being in continuous and direct thermal contact with the first conduit.

In addition to one or more of the above disclosed aspects, or as an alternate, the first conduit entrance diameter is substantially the same as the first conduit exit diameter.

In addition to one or more of the above disclosed aspects, or as an alternate, first conduit central diameter is between two and seven times the first conduit entrance diameter.

In addition to one or more of the above disclosed aspects, or as an alternate, the first conduit central diameter is ten to forty times greater than the second conduit diameter.

In addition to one or more of the above disclosed aspects, or as an alternate, the second conduit length is ten to fifty times greater than the first conduit length.

In addition to one or more of the above disclosed aspects, or as an alternate, the system includes a flow redirector located inside the entrance region of the first conduit, the flow director defining an axisymmetric shape, the flow director axis of symmetry colinear with the first axis, the flow redirector defining an upper top surface and lower outer edge, the upper top surface defining a convex or conical shape diverging downwards, the lower outer edge defining the outer perimeter of a region of concave surface extending upwards to the upper top surface, the flow redirector concave surface and outer edge defining an outer edge tangent angle, the tangent angle defining an angle within 30 degrees of horizontal relative the first, a gap is formed between the lower outer edge of said flow redirector and the entrance portion of the first conduit to define a flowpath therebetween; and an outside diameter of said flow redirector being smaller than an internal diameter of the entrance region of the first conduit.

In addition to one or more of the above disclosed aspects, or as an alternate, the system includes a nozzle located above said flow redirector that has a substantially cylindrical geometry at a lower edge of the nozzle, the nozzle located substantially coaxially with said first conduit and said flow redirector, and configured for being removable from the heat exchanger by biasing along the first axis away from the bottom end of the first conduit.

Further disclosed is a shower system including: a shower or bathtub, a drain including the system having one or more of above disclosed aspects, wherein, in operation, the first fluid is drain water and flows substantially into the first conduit, and the second fluid is water that is colder than the first fluid and that flows through the second conduit to a shower mixing valve of the showers system.

In addition to one or more of the above disclosed aspects, or as an alternate, the system includes rib structures formed on an internal surface of the first conduit that protrude inwardly towards the first axis from said wall such that in operation the rib structures engage the drain water flowing through the first conduit, the rib structures defining flow channels therebetween.

In addition to one or more of the above disclosed aspects, or as an alternate, the system includes ribs structures formed on an internal wall of the first conduit that protrude inwardly towards the first axis, by less than 3 mm from said internal wall to define a height of the ribs, the rib structures defining flow channels therebetween.

In addition to one or more of the above disclosed aspects, or as an alternate, the system includes vortex generator features, including a protruding feature extending toward the first axis, thereby into the flow stream in operation, from said internal surfaces of the first conduit; having a substantially planer upstream face that is parallel to the first axis of the first conduit; at a 20 to 70 degree angle relative to a radial axis of the first conduit, along said internal surface; said vortex generator protruding from said channel a distance substantially equal to the height of the ribs, and are one or more are disposed in one or more of the flow channels defined between said ribs.

In addition to one or more of the above disclosed aspects, or as an alternate, the first and second conduit are joined by brazing or soldering.

Further disclosed is a fluid to fluid heat exchanger system including a first conduit that extends from a first conduit top end along a first axis to a first conduit bottom end to define a first conduit length, the first conduit defining: an entrance region that extends along the first axis from the first conduit top end to an entrance region bottom end, wherein the entrance region defines a cylindrical shape having a first conduit entrance diameter, wherein the entrance region is configured to receive a first fluid flow substantially parallel to the first axis, into the heat exchanger system; a central region, extending axially downward along the first axis from the entrance region bottom end, wherein the central region defines: a central region top end at the entrance region bottom end; a central region diverging portion that extends axially downwardly, along the first axis and conically diverges from the central region top end to a central region intermediate portion, wherein the central region intermediate portion defines a first conduit central region diameter that is greater than the first conduit entry diameter; and a central region converging portion that extends axially downwardly along the first axis and conically converges from the central region intermediate portion end to a central region bottom end, the central region bottom end defining a first conduit exit diameter that is less than the first conduit central diameter; an exit region that extends along the first axis from the central region bottom end to the first conduit bottom end, wherein the exit region defines a cylindrical shape having the first conduit exit diameter; a second conduit system defining a second conduit diameter that is smaller than the first conduit entrance diameter, and a second conduit length that is longer than the first conduit length, wherein the second conduit is helically wrapped about the first conduit central region, from the central region top end to the central region bottom end, wherein the second conduit contacts the first contact substantially continuously along its length, thereby being in continuous and direct thermal contact with the first conduit, the second conduit system having two or more conduits arranged in parallel.

In addition to one or more of the above disclosed aspects of the further embodiment, or as an alternate, the first conduit entrance diameter is substantially the same as the first conduit exit diameter.

In addition to one or more of the above disclosed aspects of the further embodiment, or as an alternate, first conduit central diameter is between two and seven times the first conduit entrance diameter.

In addition to one or more of the above disclosed aspects of the further embodiment, or as an alternate, the first conduit central diameter is ten to eighty times greater than the second conduit diameter.

In addition to one or more of the above disclosed aspects of the further embodiment, or as an alternate, the second conduit length is ten to fifty times greater than the first conduit length.

BRIEF DESCRIPTION OF THE DRAWINGS

The present disclosure is illustrated by way of example and not limited in the accompanying figures in which like reference numerals indicate similar elements.

FIG. 8 is an isometric view from the top, of the upper shell and flow redirector only, to make visible the mounting features of the flow redirector;

DETAILED DESCRIPTION

Figure 1:
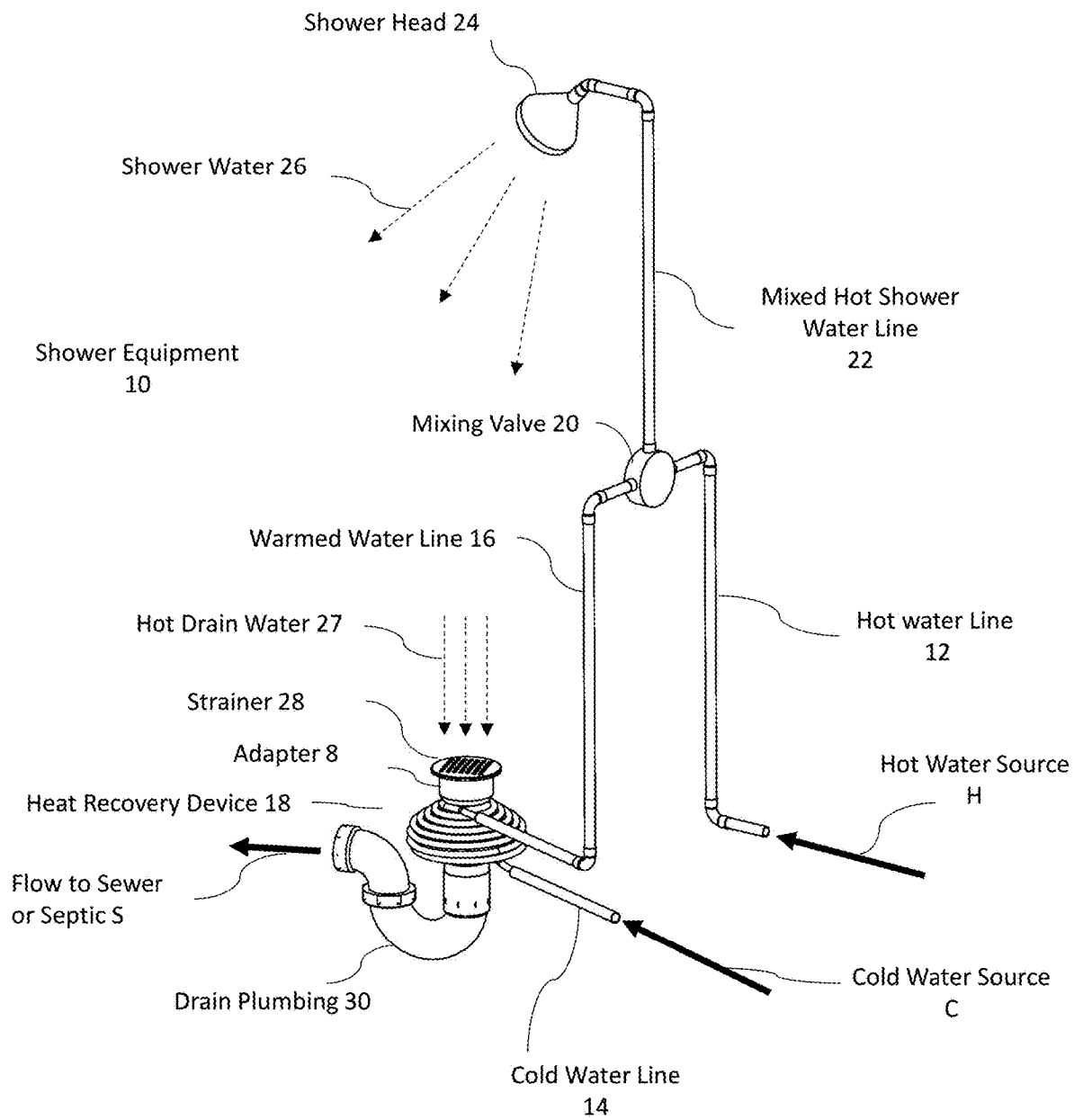
FIG. 1 is a generally diagrammatic perspective view of the plumbing of a typical personal shower equipment installation incorporating the heat recovery device of a disclosed embodiment.

Ideally, the heat energy that is lost down the drain of a shower could be transferred to the incoming cold water, in order to pre-heat the cold water, and thus reduce the amount of hot water that needs to be mixed with the cold water in order to achieve a comfortable shower temperature. It is estimated that approximately 7-8% of home energy consumption in the US is used for heating shower water, so if this energy requirement can be significantly reduced through heat recovery, a substantial reduction in total national energy consumption would be realized over time with widespread adoption. The current state of the art for shower water heat recovery devices is large and expensive, approximately 4-6 feet long and about 25 pounds (lbs), and therefore impractical and uneconomical for installation in most dwellings, and therefore there is a very low adaption rate for existing products.

There is a need for a relatively inexpensive, efficient, maintenance free, and relatively easy to install device for recapturing heat from shower wastewater after it has entered the shower drain and transferring that heat to the incoming cold water before the cold water reaches the mixing valve.

The present disclosure describes a relatively thin-film, relatively high-velocity, relatively high-efficiency heat exchanger device, which is suitable for use as heat recovery device for domestic showers. The device is compact in size, allows for relatively easy access for drain clean-out, reliably separates the cold water and drain water streams by using separate conduits, is relatively straightforward to install, and is relatively easily manufacturable and cost effective. The present design has a relatively compact vertical dimension, which makes it suitable to fit into the space that is typically available beneath domestic shower installations.

One of the features that enables this heat recovery device to function with the required efficiency and small size is that the design exploits the Coanda effect, which is the phenomenon that a fluid flowing along a surface will have a tendency to adhere to that surface. This effect is further enhanced by surface tension effects that are present when there is a fluid/air interface above the flowing film of fluid. This allows the fluid to more easily maintain its velocity, since it will not be slowed down by viscous effects of the bulk fluid that may dissipate the dynamic energy of the fluid layer near the wall. The adhesion (Coanda) effect enables a fluid stream to remain in contact with the bottom of an inverted surface that is angled only somewhat down hill from the horizontal plane. This shallow down hill angle allows the important vertical dimension of the device to be quite small, with the required volume made up by the horizontal dimensions, which are typically easily accommodated in a shower drain area. With the disclosed configuration, the water velocity within the device can remain high, using only the relatively small amount of dynamic and potential energy contained in the descending drain water, enabling the drain water to maintain contact with the internal heat exchanger surfaces, and also to maintain a high velocity, which leads to a high convection coefficient and thus a high efficiency device.

Turning to the drawings, FIG. 1 is a generally diagrammatic perspective view of the plumbing of a typical personal shower equipment installation incorporating the heat recovery device disclosed herein. It can be seen that the heat recovery device 18 has a cold water jacket conduit 2 (FIG. 2) wound around the shell assembly 9 and is connected (plumbed) in series on an upstream side with a cold water line 14, and connected in series on a downstream side with a downstream cold water conduit designated as the warmed water line 16. The warmed water line 16 is connected at its downstream end to a mixing valve 20.

The shell assembly 9 of the heat recovery device 18 is connected (plumbed) in series with drain water plumbing, sometimes referred to as drain plumbing. The drain water plumbing includes a strainer 28, an adapter 8 supporting the strainer 28 and connected to an inlet portion of the shell assembly 9, and downstream plumbing conduits, e.g., including a drain trap as part of drain plumbing 30.

The shell assembly 9 defines therein a first conduit (or drain conduit), through which the hot drain water passes. The strainer 28, a common part on shower drain installations that is intended to prevent large objects from entering the drain plumbing, sits on top of the adapter 8. The adapter 8 is retained in a watertight fashion (using a rubber or foam gasket, or caulking, not shown) to the shower floor 60 (FIG. 5), with a fastener (nut) from below the floor (this is standard in shower drain plumbing hardware and is not shown). The heat recovery device 18 is retained on the adapter by an elastomeric compression seal 3, which is compressed by a nut from above that sits against the seal (nut not shown, this is a standard and well-known shower drain set-up).

Figure 1A:
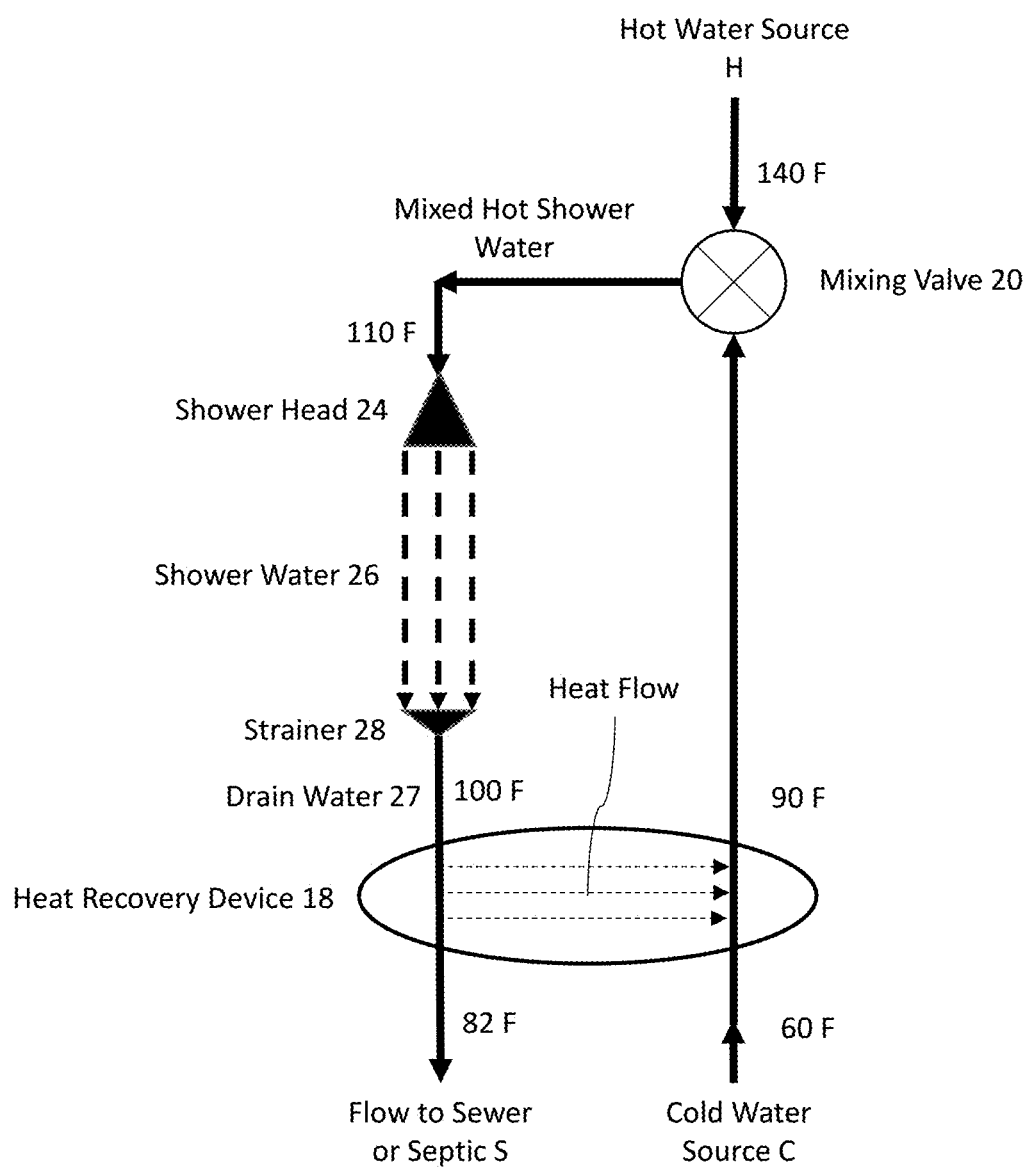
FIG. 1A is a schematic diagram of the shower heat recovery device connected within a shower system.
Figure 2:
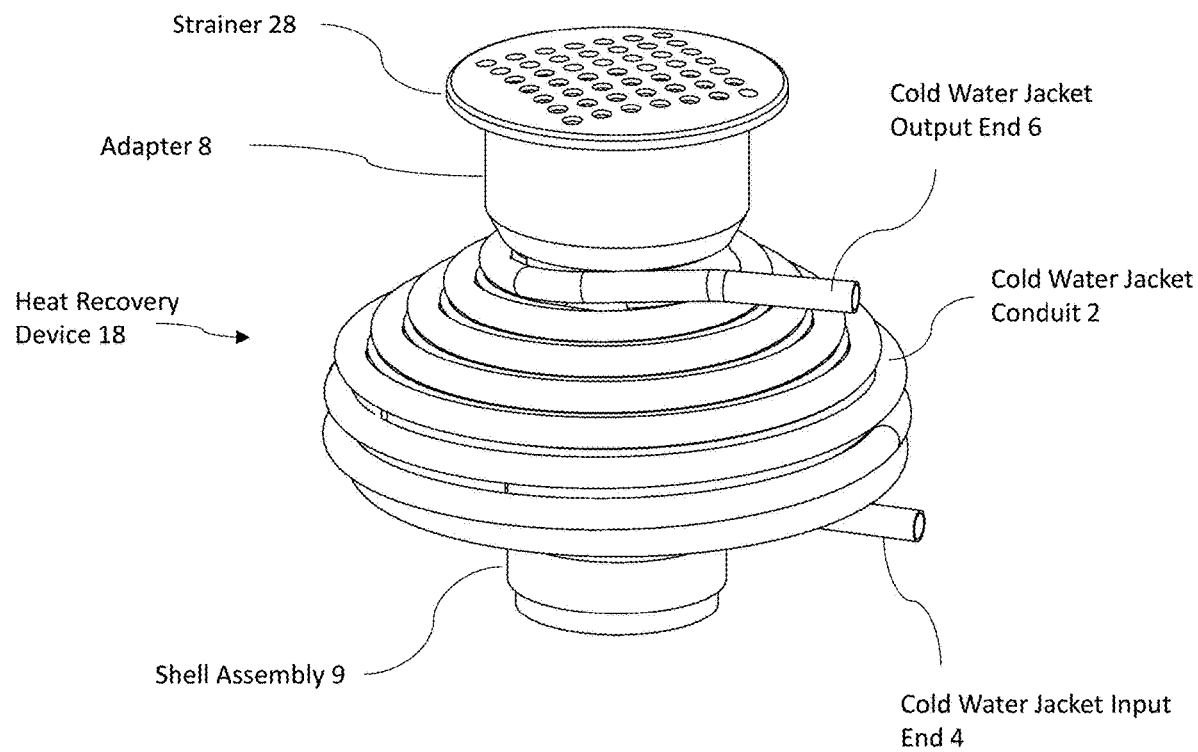
FIG. 2 is a perspective view of an embodiment of the heat recovery device utilized in the shower equipment installation shown in FIG. 1.

FIG. 1A is a schematic diagram that shows the water flow and heat flow circuits of an installed shower heat recovery system employing the heat recovery device 18. Examples of typical temperatures in Fahrenheit at various points in the system are shown. It should be understood that although every installation and user will have different temperatures according to their preference for mixing valve setting (actual shower temperature) and incoming hot water temperature (set at the boiler or water heater), the energy recovery principle is the same. The cold water source C is assumed to enter the system at sixty (60) degrees Fahrenheit, and then exits the heat recovery device at about thirty (30) Fahrenheit degrees warmer than it entered, or about ninety (90) degrees Fahrenheit for example. The warmed water then enters the mixing valve 20 where it is mixed with hot water from the hot water source S, coming from a boiler or other type of hot water heater, which is assumed to be one hundred and forty (140) degrees Fahrenheit, and then exits the mixing valve 20, typically at about one-hundred and ten (110) degrees Fahrenheit. The water then flows through the shower head 24 for use, where it then typically cools to about one hundred (100) degrees Fahrenheit by the time it enters the heat recover device 18. There, the one hundred (100) degree Fahrenheit drain water 27 is further cooled to about eighty-eight (82) degrees Fahrenheit, with the heat being transferred across the heat recovery device 18 and into the continuing stream of incoming cold water. The temperature drop in the drain water as it flows through the heat recovery device 18 is smaller than the temperature increase of the cold water as it flows through heat recovery device 18 because the flow rate of the cold water is significantly lower than the drain water flow rate. With the example temperatures as shown in the present schematic, the cold water flow rate would be sixty percent (60%) of the drain water flow rate, thus the temperature drop in the drain water flow through the device is sixty percent (60%) of the temperature increase on the cold water side of the device. At the above conditions, hot water consumption is reduced by thirty-five percent (35%) compared to no heat recovery device, FIG. 2 is an isometric view of the assembled (but not installed) heat recovery device 18, showing the strainer 28, which sits upon the adapter 8, which is secured to the shower floor 60 (FIG. 5), and is also connected in a leak-proof fashion to the heat recovery device 18.

Figure 3:
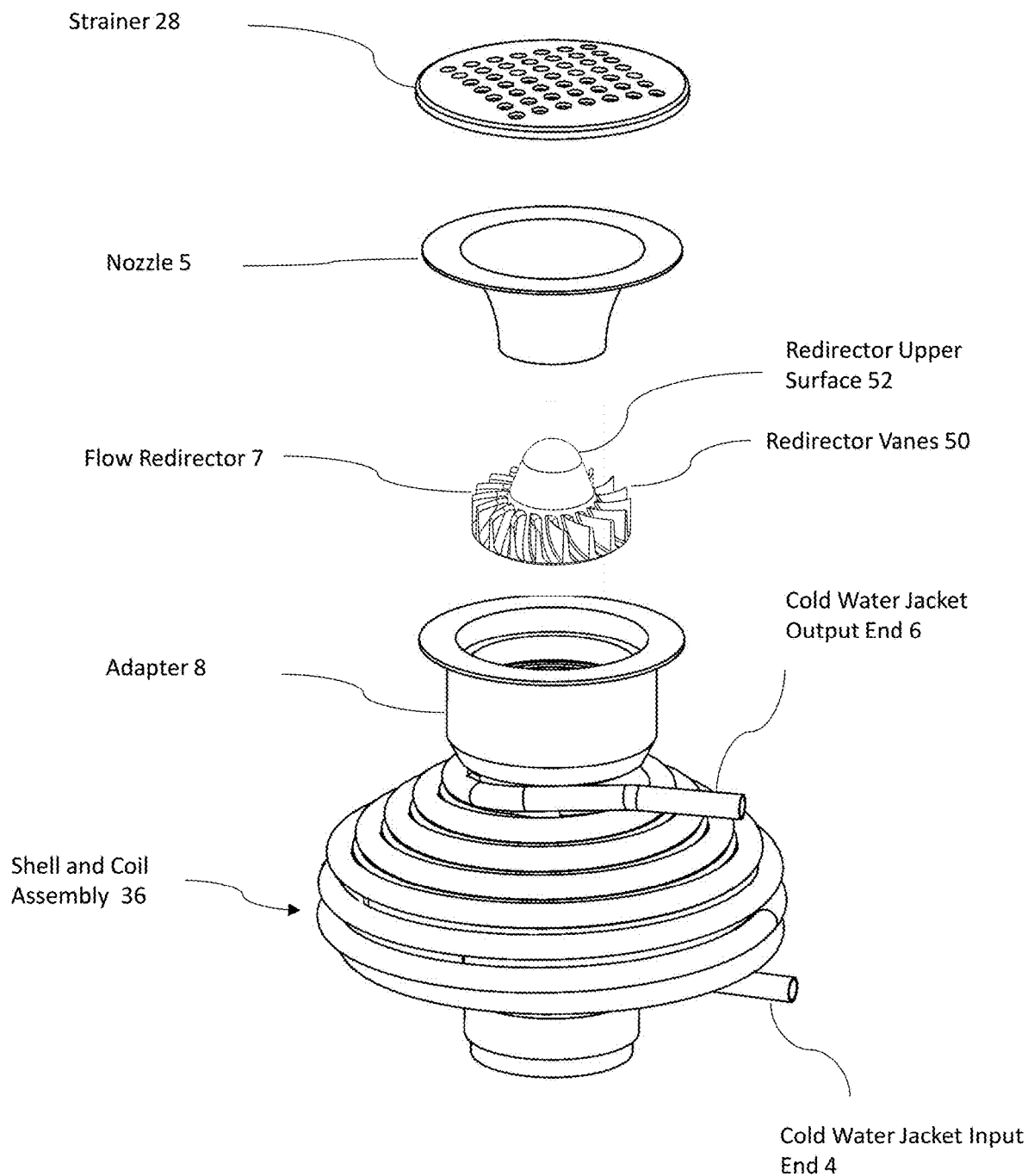
FIG. 3 is and exploded perspective view of the heat recovery device illustrating the vertical removal of the strainer, nozzle, and flow redirector.

FIG. 3 is an exploded perspective view, showing the strainer 28, the flow concentrator nozzle 5, and the flow redirector 7 as they would be removed from the shower equipment installation 10 in the event that the heat recovery device 18 or any downstream drain plumbing 30 becomes clogged. Removal of these components gives direct access straight through the heat recovery device 18 and into the downstream plumbing which is required for clearing clogs of the heat recovery device 18 and of any downstream plumbing conduits. The removal process for the three (3) removable components 28, 5, 7 starts by lifting out the strainer 28, after which the nozzle 5 may be directly accessed and removed by lifting it straight up and out, followed by lifting out the flow redirector 7, which is then readily accessible. The heat recovery device would then allow direct access, straight through the device, to the downstream plumbing.

Figure 4:
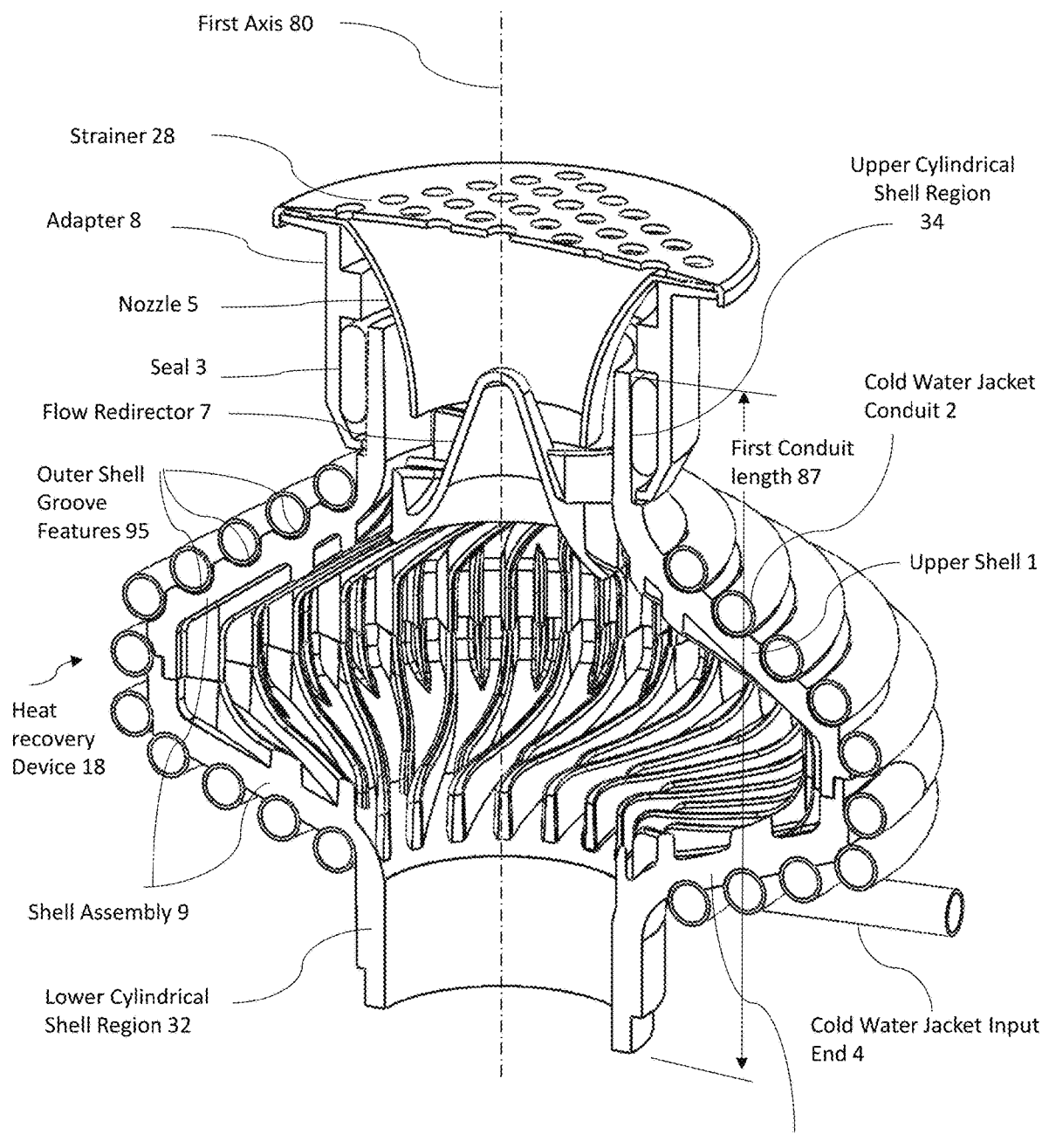
FIG. 4 is a sectional view of the perspective view of FIG. 2 cut by a vertical plane.

Turning to FIG. 4, the heat recovery device 18 contains an upper cylindrical shell region 34 that serves as an upper entrance region of the first conduit shell assembly 9, where the device 18 interfaces with adapter 8. A first axis 80 is the axis of symmetry of the upper cylindrical shell 34, and all regions of the shell assembly 9, in addition to being the axis of symmetry of the nozzle 5 and the flow redirector 7. The first conduit length 87 is the axial length of shell assembly 9. Within upper cylindrical shell region 34, the entering, descending drain water in flow region 11 (shown in FIG. 6) flows through nozzle 5, with a frustoconical shape that converges from its nozzle inlet at its axial top toward its nozzle outlet at its axial bottom to gradually concentrate the flow into a smaller diameter space compared with its inlet end as it flows along the nozzle convex curved area 37 (shown in FIG. 5) and then down to the nozzle exit region 38 where the fluid stream at that point, shown as flow region 13 (FIG. 6), is travelling parallel to first axis 80 (e.g. straight down). The shape of the flow stream in flow region 13 matches the shape of the nozzle exit region 38 of the nozzle 5, which is a cylindrical tube, since nozzle 5 will have a tendency to concentrate the water flow on its surface, which is a cylindrical in the nozzle exit region 38.

Below and somewhat overlapping the nozzle 5, and located coaxially with the nozzle 5, is a flow redirector 7. The flow redirector 7 converts the downward dynamic energy of the cylindrical fluid stream of flow region 13 to a horizontal, radially outwardly flowing thin fluid disk 61, which then impinges on the interior of the upper conical shell region 40 of upper shell 1 of the heat recovery device 18.

It should be pointed out that some of the descending drain water from strainer 28 flowing through region 11 impinges directly on the redirector upper top surface 62, and is then joined by the flow region 13 drain water that descends from the nozzle 5.

Figure 6:
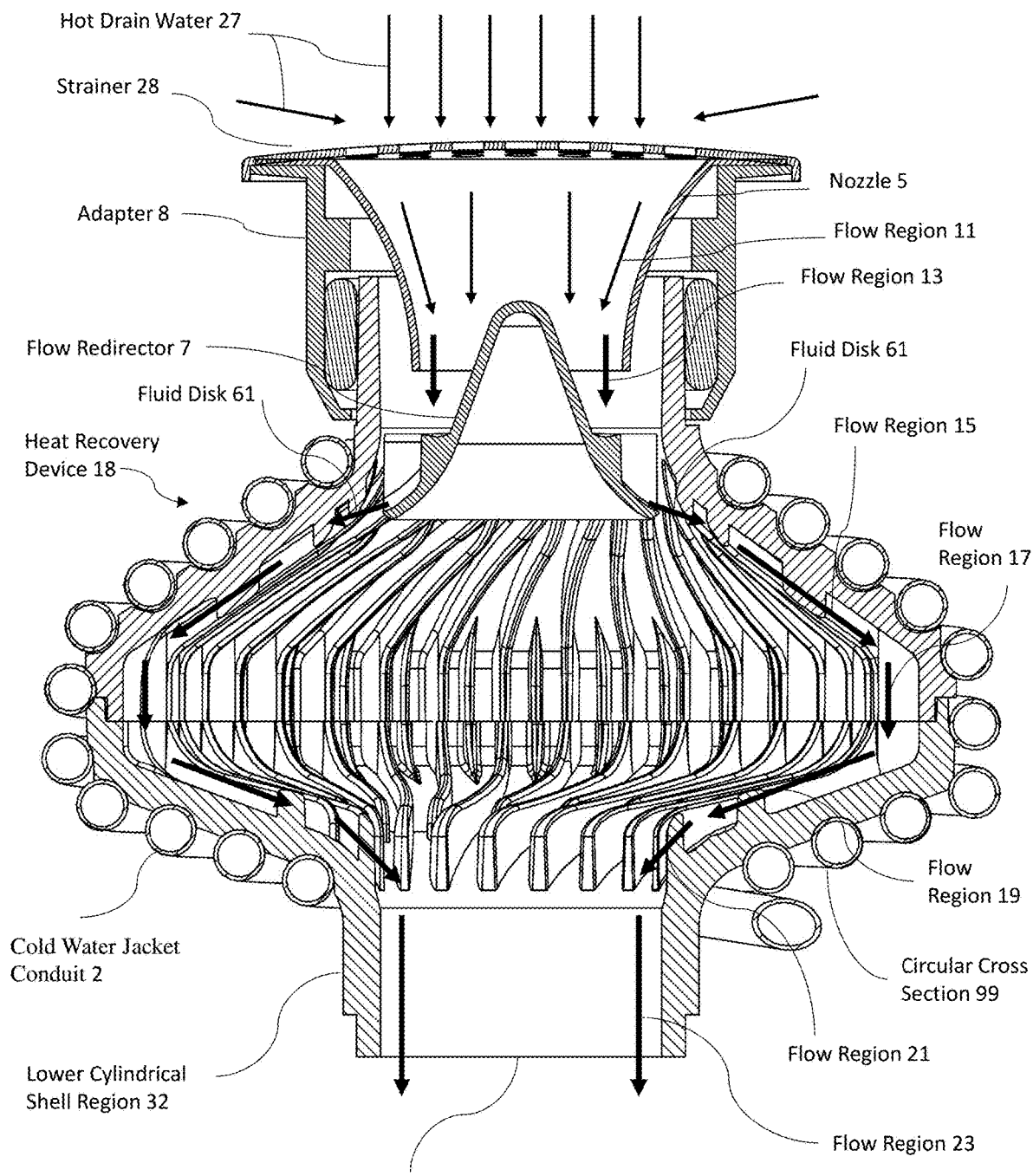
FIG. 6 is the same sectional view as FIG. 5 of the heat recovery device with the addition of arrows depicting the flow path of the drain water as it passes through the device.
Figure 7:
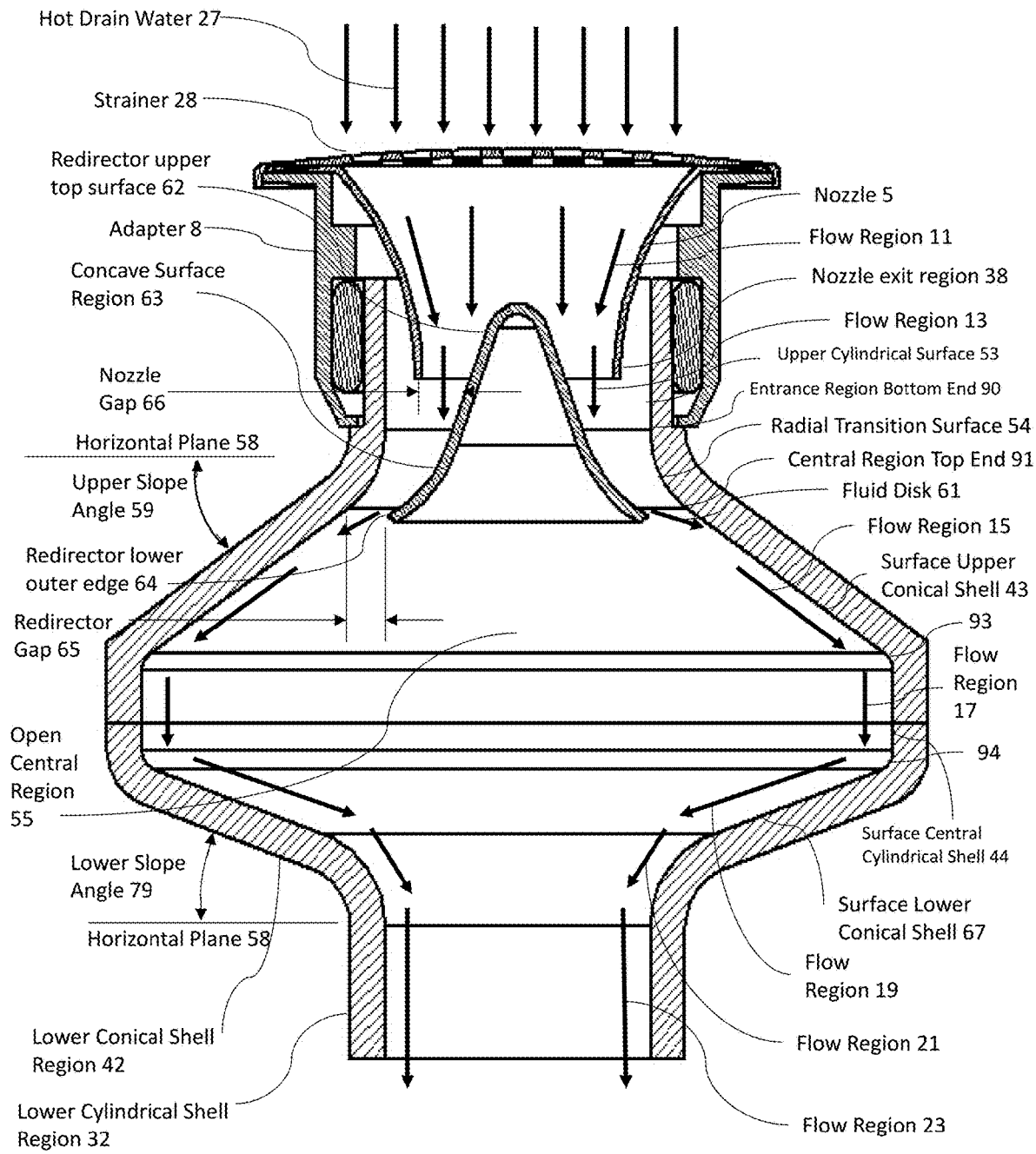
FIG. 7 is the same view as FIG. 6 but is simplified to more clearly illustrate the flow path of the drain water.

Illustrated in FIGS. 6 and 7, the flow redirector 7 defines an upper top surface 62 region that is either conical or convex or a combination of both, as shown, in order to smoothly receive the descending hot drain water 27, the first fluid, from flow regions 11 and 13. Flow region 11 defines a first downward first fluid flow substantially parallel to the first axis. Flow redirector 7 also has a lower outer edge 64 that is the lower and outer-most termination of concave surface region 63. Lower outer edge 64 has an outer edge tangent angle 88 defined by the shape of the concave surface region 63. The outer tangent angle 88 is preferably within thirty (30) degrees of a horizontal plane 92, the horizontal plane being orthogonal to the first axis. The fluid disk 61 that is released outwardly from concave surface region 63 and lower outer edge 64 travels across gap 65 (FIG. 7) (otherwise referred to as a flow redirector gap) until it impinges upon and adheres to upper conical shell surface 43. Outer edge tangent angle 88 being horizontal, or nearly horizontal, creates a positive flow approach angle 72 (FIG. 9), which is required for fluid disk 61 to flow cross redirector gap 65. There is also a gap 66 between the lower edge of the nozzle 5 and nearest surface of the flow redirector 7. The minimum gap area is large enough to provide a cross sectional flow area equal to the minimum required drain size area, which is equal to the cross sectional open area of either a one and a half (1.5) inch diameter or two (2) inch diameter pipe, in order to comply with applicable Uniform Plumbing Codes, depending on whether this is used in a shower-only, or a tub and shower installation. The same is true for the gap between the lower outer edge 64 of the flow redirector 7 and the nearest surface of the upper conical shell 43. The fluid flow may also be directed in a spiral manner by optional vanes 50 on the flow redirector 7 as it flows outwardly from the outer edge of the flow redirector, in order to provide a more even delivery of fluid disk 61 to surface 43 of the upper conical shell. The vanes 50 are a set of evenly spaced circumferentially offset vanes formed as arcuate plates distributed about a lower ring defined by the flow redirector.

When flow redirector 7 redirects the flow stream radially outward from the vertical centerline of the device, the flow becomes a relatively thin disk of fluid 61, at one (1) to two (2) millimeters thick. It is a relatively high velocity flow, at about one (1) to two (2) meters per second at this point, which allows it to continue to flow outwardly, beyond the lower outer edge 64 of the flow redirector 7, to then impinge on the interior conical surface 43 of the upper shell 1. The redirector lower outer edge 64 is a sharp corner, so that the flow departs from this feature reliably. The nozzle 5 and flow redirector 7 define a passive flow management system that ensures that the first fluid, hot drain water 27, flowing through the heat recovery device 18 remains at maximum velocity and has maximum contact with the interior surfaces 43, 44, of the shell assembly 9. This provides optimal fluid flow for efficient heat transfer of the heat from the drain water 27 to the shell assembly 9.

Both the passive flow management components, nozzle 5 and flow redirector 7, can be quickly and easily removed, potentially within a few seconds, and potentially without requiring tools, by the homeowner, for the purpose of clearing the drain plumbing 30 in the event of a downstream drain conduit clog, or for accessing the open central region 55 of the heat recovery device if it is clogged. Because these two passive flow management components also result in the drain water 27 forming a thin energetic film over a relatively short vertical distance, potentially within about two (2) inches, this allows the disclosed device to have a small overall vertical size, which may be about five to seven inches, enabling it to fit into the required space typically available under the typical shower drain area.

The present heat recover device has surface upper conical shell 43, surface central conical shell 44, and surface lower conical shell 67, where the transfer of heat from drain water 27 occurs, which are the internal surfaces of the upper conical shell region 40, central cylindrical region 41, and lower conical shell region 42, outside of the direct, straight-through, straight down path through the open central area 55, thus causing no impediment to the ability to access downstream drain plumbing 30 for clearing downstream clogs. Further, as a general principle, fluid velocity through a conduit is an important factor contributing to keeping the conduit remaining clean and unfouled by debris and growth. The present design promotes high velocity drain water 27 flow within the heat recovery device, about one (1) to two (2) meters per second or greater, throughout the flow through the shell assembly 9, thus having a tendency to keep the internal surfaces of upper conical shell region 40, central cylindrical region 41, and lower conical shell region 42 clean and unfouled.

Figure 5:
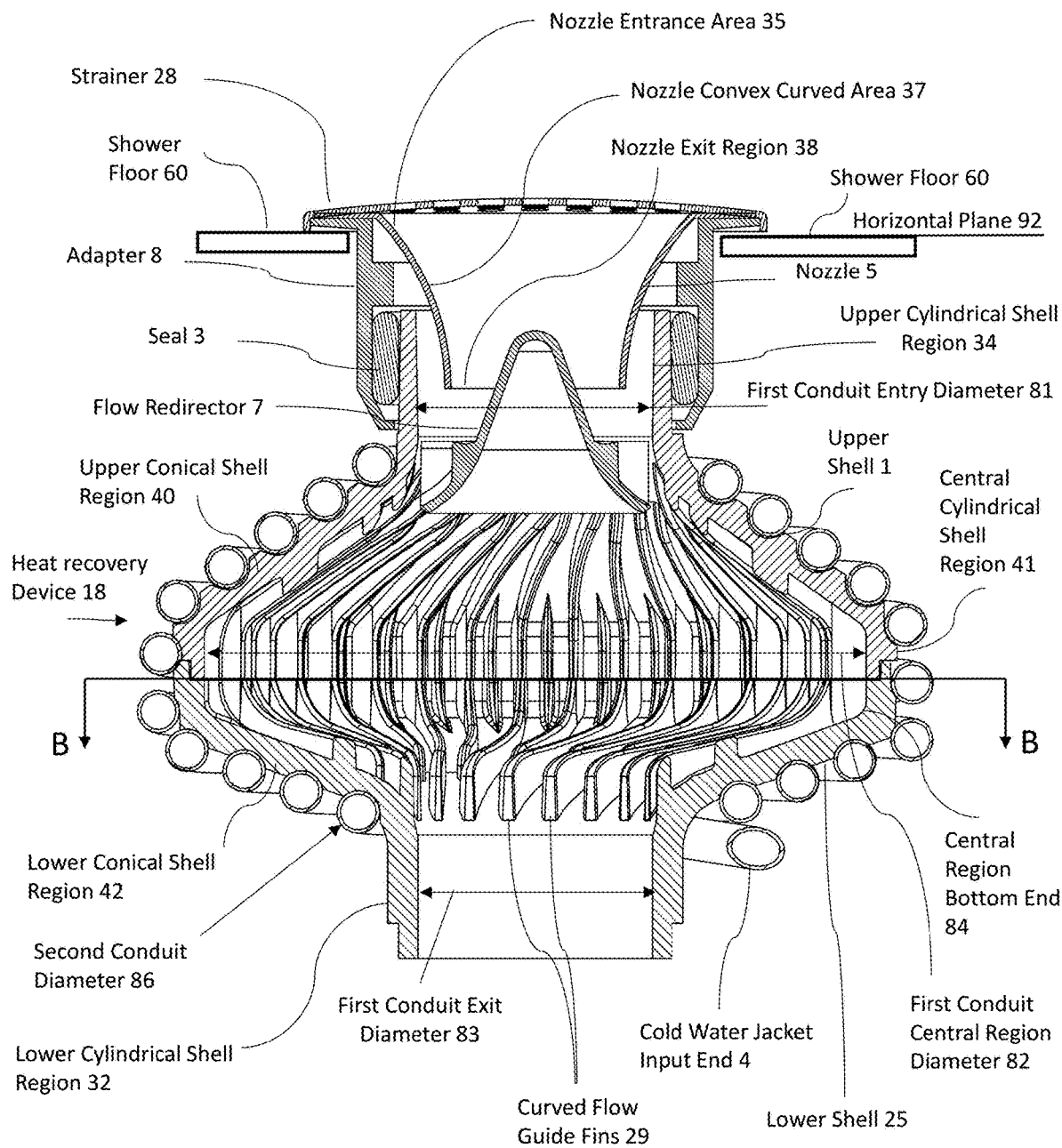
FIG. 5 is a view similar to FIG. 4, except that it is a planar view of the heat recovery device with crosshatching to show additional features of the sectioned components.

FIG. 5 is a sectional side view of the heat recovery device 18 including the drain adapter 8 and the drain adapter seal 3 and the strainer 28, with the internal curved flow guide fins 29 and external cold water conduit jacket 2 not shown for simplicity. The seal 3 shaped as an o-ring with an oblong cross-section is a standard drain plumbing component and may be elastomer and may provide a leak proof connection between the adapter 8 and the heat recovery device 18.

The shape of the flow focusing nozzle 5 is visible in FIG. 5 and consists of a typical nozzle shape. For example, the nozzle 5 is a gradually and smoothly decreasing diameter starting from the nozzle entrance area 35 located at the axial top end of the nozzle 5 that transitions to a convex curved area 37 at an axial intermediate location and then to a nearly straight and substantially cylindrical section at the axial lowest point in the nozzle exit region 38 where the flow exits.

The flow exiting the nozzle 5 is shown as flow region 13 in FIG. 6. and flows directly downward and impinges on the flow redirector 7, where it is redirected outwardly towards flow region 15 and towards upper conical shell region 40, which is the first heat transfer surface of shell assembly 9. The nozzle exit region 38 has a diameter that is between 50% and 75% of a diameter of the upper cylindrical shell region 34, so that the nozzle exit region 38 is large enough such that, at expected flow rates, the water will not fully fill the annular area between the nozzle exit region 38 and the flow redirector 7, due to the nozzle gap 66 (shown in FIG. 7) and thus flow region 13 will, by design include a substantial air gap in addition to the water flow. This feature helps ensure the flow of water will maintain its kinetic energy and follow along all surfaces as intended rather than passing through the open central region 55 within the shell assembly 9, and the open central region volume 55 will remain substantially filled with air, while the drain water remains adhered to the interior surfaces of the shell assembly 9 as it rapidly passes through.

Referencing FIGS. 5 and 6, the upper cylindrical shell region 34 extends axially along, and thus surrounds, the lower part of nozzle 5 and the upper part of flow redirector 7, and also the downwardly falling hot drain water 27 from above, which is flowing down from strainer 28, which may be a standard shower strainer. After the used but still relatively hot shower water 27, which is typically about one hundred (100) degrees Fahrenheit at the time it enters the drain area, e.g., by passing downwardly through the strainer 28, the water enters the region 11 of the flow focusing nozzle 5, as illustrated in FIG. 6. The nozzle 5 has a gradually decreasing diameter starting from the nozzle entrance area 35, which has the effect of concentrating and accelerating the downward speed of the drain water due to defining a nozzle exit that has reduction in the perimeter surface area (e.g., a smaller exit aperture than entry aperture defined by the nozzle).

The gradually reducing diameter of the nozzle 5 causes the separate droplets and water streams flowing down from the strainer 28 to gather into a more aggregated annular fluid stream, which has the effect of concentrating the dynamic energy of the stream, thus causing it to flow faster than it would otherwise flow. This is useful for when the flow impinges on the flow redirector 7, as the flow stream requires a certain amount of dynamic energy in order to reform as a thin film fluid disk 61 as it exits the flow redirector 7, which requires the flow to be at an adequate speed. If the dynamic energy of the flow stream leaving the flow redirector 7 is not sufficient, the flow from the bottom edge of the flow redirector would simply drip downward and go through the open central region 55 of the shell assembly 9, and thus not transfer any significant heat to the heat recovery device 18, rendering the device ineffective.

The flow path of the hot drain water 27 through the device is illustrated in FIGS. 6, 7. As the water exits the nozzle 5, it continues to accelerate downward due to gravity in flow region 13, where is impinges on the flow redirector 7, where it is smoothly redirected radially outwardly from the central axis of the flow redirector 7 (and nozzle 5, which are substantially coaxial with each other and with the shell assembly 9). As the flow in region 13 impinges on flow redirector 7, the kinetic energy of the flow is efficiently redirected outward by the smooth, bell-shaped energy redirector 7. The bell shape causes the flow to smoothly attach to its surface as it descends from the nozzle 5, where the flow is then smoothly directed outward from the central axis, where it continues as a relatively thin (approximately 1 mm or less), radially expanding, substantially horizontally flowing fluid disk 61. The flow redirector 7 changes the angle of the flow from nearly vertically downward to within thirty (30) degrees or less of horizontal as it departs the outer perimeter of the flow redirector 7. It should be noted that the fluid disk 61, is initially in a horizontal plane (e.g., flowing radially) as it is released from (e.g., flows off of) the flow redirector outer edge 64, FIG. 7, and curves downward (e.g., in the axial direction relative to the system) under the force of gravity if it does not encounter another surface on which to adhere, such as surface upper conical shell 43.

The flow redirector 7 may optionally contain multiple upwardly projecting flow redirector vanes 50 on its upper surface 52 near the redirector lower outer edge 64 as shown in FIG. 3, which may also be curved in order to impart and rotational component to the outwardly flowing water. The vanes 50 have a shape that is aligned radially near the center, aligned with the radial direction of the system, which is also aligned with an outward flow, and then curved as they approach the redirector lower outer edge 64, in order to impart a rotational component to the outward flow.

Turning back to FIG. 7, as the water travels outward from the central axis of the flow redirector 7 and away from the redirector lower outer edge 64 as fluid disk 61, the water impinges on the interior surface 43 of the upper conical shell region 40 of the heat exchanger shell assembly 9, and adheres to the upper conical shell surface 43. The transition between the interior upper cylindrical surface 53 and the surface of the upper conical shell 43, defines a smooth radial transition surface 54, which is between the entrance region bottom end 90 and central region top end 91, e.g., rather than a sharp corner, in order to preserve the dynamic energy of the flow of the fluid disk 61, thus maintaining the relatively high velocity flow.

With reference to FIGS. 6 and 7, as the drain water 27 flows through the shell assembly 9 in flow region 15, it reaches the area of maximum first conduit central region diameter 82, of the interior conical shell region 40 (FIG. 5), which is the upper part central shell region 93 of the interior of the upper shell 1. The flow in flow region 15 is then directed in a downward direction by the internal surface central cylindrical shell 44, in flow region 17, where the flow transitions to the adjacent central cylindrical shell region 41 of the lower shell 25 having an internal surface central cylindrical shell 44. The flow is then redirected back inward in flow region 19 by the upwardly facing internal surface of the lower conical shell 67 of the lower shell 25. The central cylindrical shell region 41 consists of the lower-most portion of the upper shell 1 and the upper-most portion of the lower shell 25.

A slope angle 79 defining the angle of the lower conical shell region 42 can be flatter than the upper conical shell region 40, since there is minimal risk of the flow separating from surface lower conical shell 67. The slope angle 79 of the lower conical shell region 42 is formed that will maintain the velocity of the flow, thus maintaining the thinness of the flow and therefore the desired convection coefficient. Lower slope angles 79 between ten (10) and thirty (30) degrees have been found to effectively maintain the flow velocity as required.

The cylindrical and conical internal surfaces contain fins 29 that extend perpendicular to the surface and thus into the fluid stream and are in the general direction of the fluid flow along the internal surfaces, which also serve the purpose of increasing the heat transfer surface area and thus increase the efficiency. The fins 29 extend internally, toward a center axis of the conduit, from both the upper and lower shell 1, 25, from the radial transition surface 54 of the upper shell 1 to the bottom end of the lower shell 25, first conduit bottom end 85, and are circumferentially spaced apart to form fin channels 57, configured to guide fluid flow, between each pair of adjacent fins 29.

The fin channels diverge as the upper shell 1 diverges, from the radial transition surface 54 to the central cylindrical shell region 41. The fin channels appear to extend along the system axis, first axis 80, in the central cylindrical shell region 41 that defines the lower part of upper shell 1 and the upper part of lower shell 25. The fins 29 and channels 57 converge, in the lower shell 25, as the lower shell 25 converges, toward the lower cylindrical shell region 32.

With continuing reference to FIGS. 6 and 7, it can be seen that one embodiment of the heat recovery device 18 has a generally tubular vertical upper cylindrical shell region 34, which is the entrance region, and is formed of a material having a relatively high degree of heat conductivity, such as copper, and is integral to the upper shell 1 half of shell assembly 9. The entrance region, upper cylindrical shell region 34, has a first conduit entrance diameter 81. The shell assembly defines an upper shell 1 and a lower shell 25 suitable joined and functioning as one part. The upper shell 1 increases in diameter below the upper cylindrical shell region 34 to form an upper conical shell region 40, which continues outward and downward until upper shell 1 reaches a maximum diameter, which is referred to as a first conduit central region diameter 82, which is two (2) to seven (7) times larger than the first conduit entry diameter 81 in the upper cylindrical shell region 34. The upper shell 1 and lower shell 25 are joined in the central cylindrical shell region 41, the region defining the first conduit central region diameter 82, by brazing, soldering, or welding. At the central region bottom end 84, the diameter of the lower shell 25 decreases conically in the lower conical region 42 from the first conduit central region diameter 82 of the central cylindrical shell region 41 to a diameter similar to upper conical shell region 34, where it smoothly transitions to a lower cylindrical shell region 32. The lower cylindrical shell 32 region may be alternatively referred to as a first conduit central region bottom end. Lower cylindrical shell region 32 is the first conduit exit region, having a first conduit exit diameter 83, which is the drain water exit area of the heat recovery device 18, and is designed to interface to standard drain plumbing 30 conduits and fittings, represented as drain trap in FIG. 1. The lower most part of the shell assembly 9 is the also first conduit bottom end 85 (FIG. 6).

The external surfaces 47, 48 (surfaces simplified in FIG. 14), of the shell assembly 9 of the heat exchanger 18 are substantially covered with a helically wound cold water jacket conduit 2, also referred to as the second conduit, having a second conduit diameter 86. Conduit 2 in close thermal and physical contact with the shell assembly 9, which defines the upper shell 1 and lower shell 25.

FIG. 4 shows an embodiment of the heat recovery device 18 using the cylindrical cold water jacket conduit 2 and upper and lower shell surfaces 47, 48 with outer shell groove features 95 that match the coiled cylindrical shape of the cold water jacket conduit 2 in order to optimize contact area and thus thermal conductivity between the upper and lower shell 1, 25 and cold water jacket conduit 2. The cold water jacket conduit 2 is preferably made from a material with very high thermal conductivity, such as a copper alloy with a copper purity over ninety-nine (99) percent, as are the shell parts 1, 25. The cold water jacket conduit 2 is wound around the shell assembly 9 of the heat recovery device 18 in a helical manner. Preferably, the cold water jacket conduit 2 has a length that is twenty (10) to fifty (50) times longer than the vertical height of the heat recover device 18. This configuration will result in the heat from the drain water 27, that is absorbed by the shell assembly 9, being relatively efficiently transferred to the cold water. Preferably, the cold water jacket conduit 2 is brazed or soldered to the shell parts 1, 25 of the heat recovery device 18, for example in a furnace or vacuum furnace or inert gas furnace. The flow direction in the, helical cold water jacket conduit 2 is preferably upwards from the cold water jacket input end 4 to the cold water jacket output end 6, while the hot drain water 27, due to gravity, must flow downward, so that this heat recovery device 18 is of the counterflow type of heat exchanger, which will yield higher performance than a concurrent flow type.

Although the upper cylindrical shell region 34 is shown as being round in cross section, this is not essential and other substantially similar cross section shapes are within the scope of the disclosed embodiments.

Figure 10:
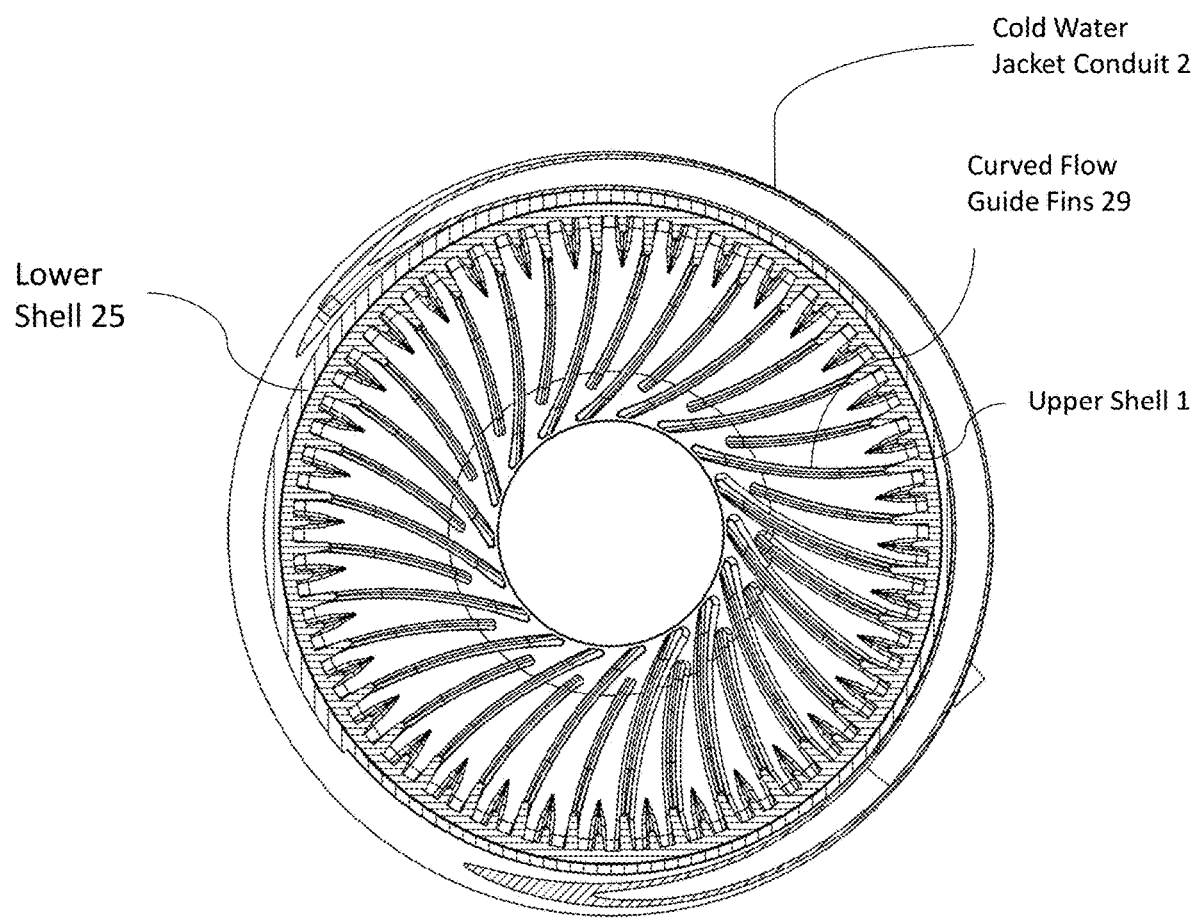
FIG. 10 is an orthogonal section view B-B from FIG. 5, of the heat recovery device looking downward at the lower shell showing a detailed view of an embodiment of the curved flow guide fins.

FIG. 10 is an top section view orthogonal to the first axis 80 looking downward at the lower half of core body 25 showing a detailed view of the flow guide fins 29. The section lines defining section B-B are shown in FIG. 4. The curved flow guide fins 29 provide a helical flow for the drain water flow as a result of their curved shape, which further preserves the energy of the flow stream, thus maintaining a higher velocity and increase coefficient of convection heat transfer. The fins 29 further provide increased surface area to transfer the heat from the drain water to the shell assembly 9 and then to the cold water jacket conduit 2, further improving the heat transfer performance of the heat recovery device 18.

Figure 9:
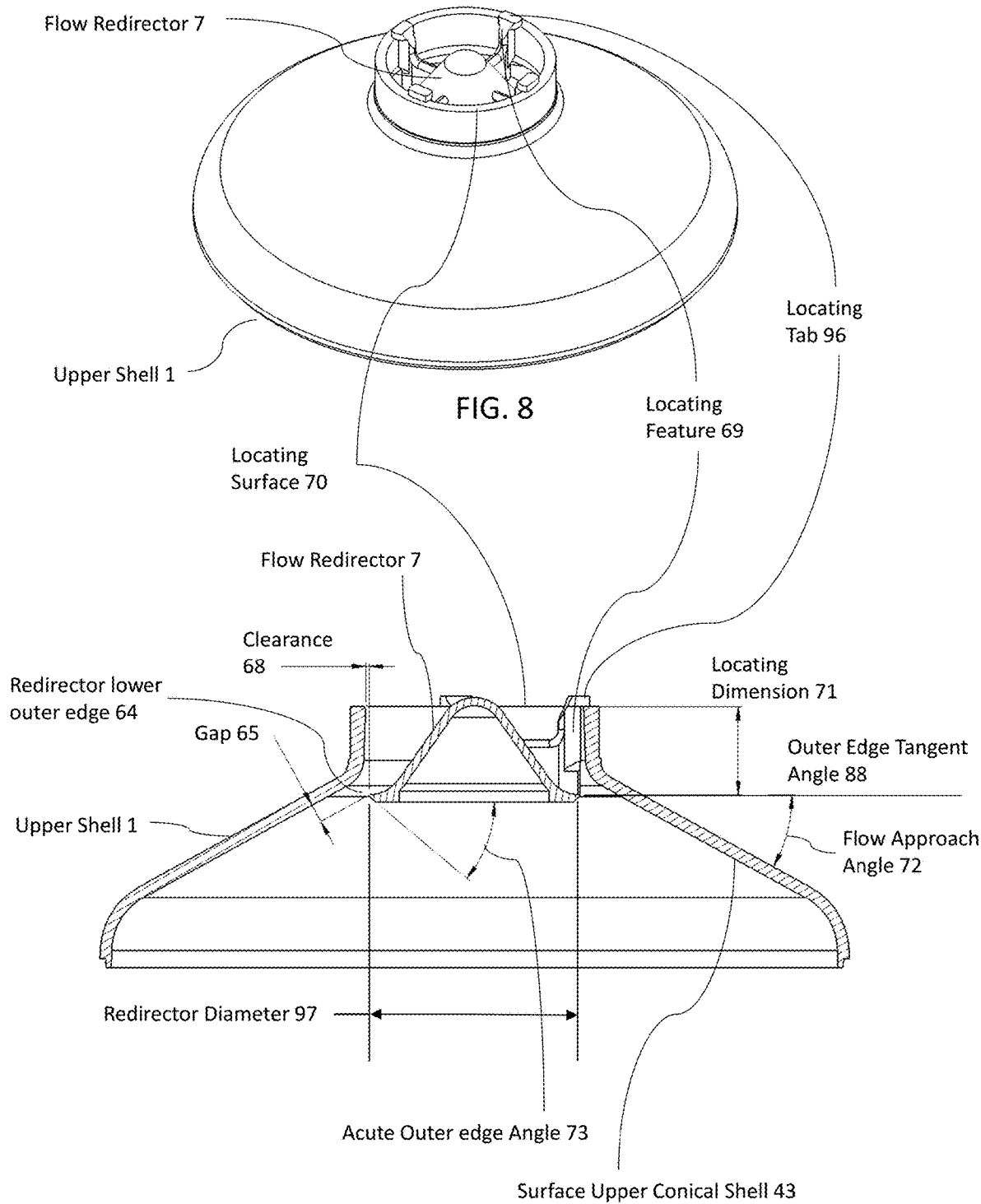
FIG. 9 is vertical plane section view of FIG. 8, further illustrating the flow redirector mounting details.

Looking at FIGS. 8 and 9, the details surrounding the way the flow redirector 7 interfaces mechanically with the upper shell 1 can be understood. The accuracy of the size of the redirector gap 65 between the redirector lower outer edge 64 and the upper conical shell surface 43 is useful for proper functioning of this heat recovery device 18, since this gap 65 allows the drain water to flow freely and to become attached to surfaces upper conical shell 43 of the shell housing 9. Integral to flow redirector 7 is locating feature 69, which interfaces directly with the uppermost surface of the upper shell 1, which is the designated locating surface 70. The locating features 69 extend upward from the redirector upper top surface 62 or the concave surface region 63. The locating features 69 may be radially arranged around first axis 80, and have locating tabs 96 that extend radially outward from first axis 80. The locating tabs 96 are configured to engage the locating surface 70 of the upper shell 1, to thereby provide physical support to flow redirector 7 and to provide accurate location both radially and axially of flow redirector 7 relative to upper shell 1, which will also prevent flow redirector 7 from dropping axially downwardly into shell assembly 9.

The configuration allows accurate positioning of the flow redirector 7 within upper shell 1 and will not be affected by any variables associated with the installation of the heat recovery device 18. The flow redirector 7 locating features 69 also interface with the upper cylindrical shell region 34 in order to ensure concentricity between the two parts 7, 1. To make removal and installation of the flow redirector 7 possible, the redirector diameter 97 of the lower outer edge 64 is smaller than the first conduit entry diameter 81 of the surface upper cylindrical shell 44. In addition, the radial outer edge 64 of the redirector lower outer edge 64 is formed with an acute outer edge angle 73, and is also relatively sharp, in order to ensure a clean and reliable release of fluid disk 61. Another feature of the flow redirector 7 and upper shell 1 configuration is that the flow approach angle 72 is greater than zero and preferably ten (10)-forty (40) degrees, in order to assure that the fluid disk 61 can consistently reattach to the surface upper conical shell 43.

Figure 11:
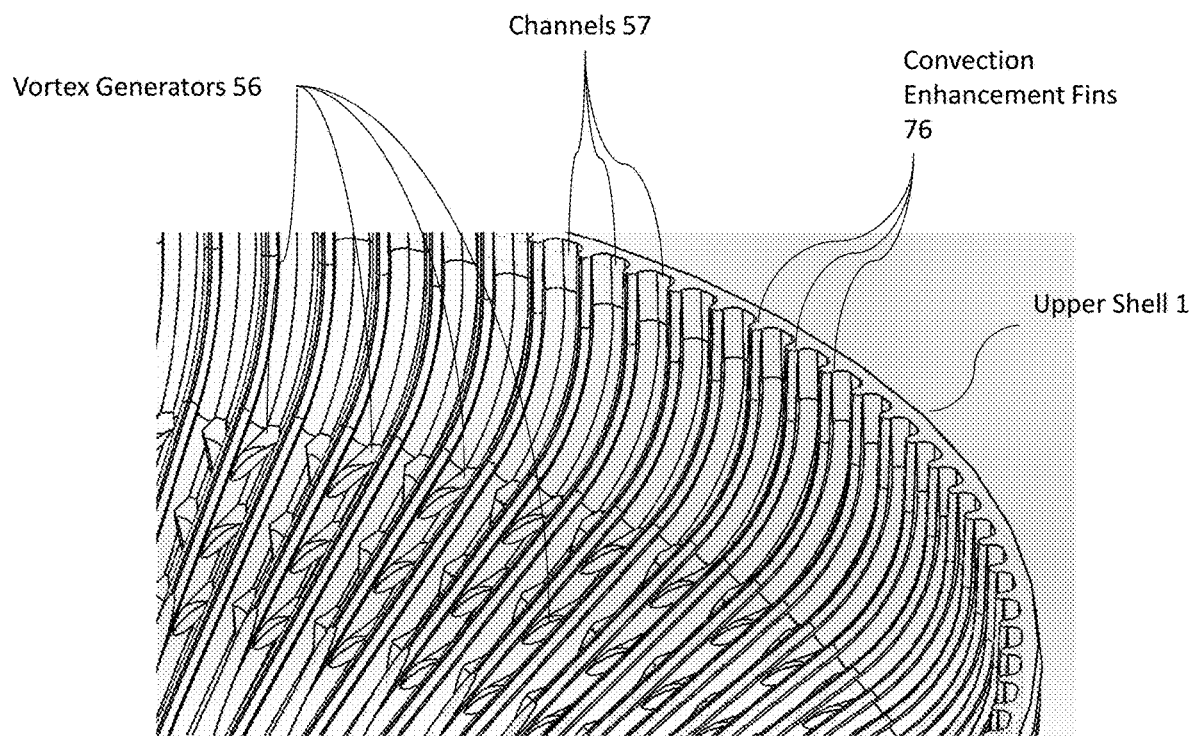
FIG. 11 is a partial isometric view of an inverted upper shell of the heat recovery device, detailing convection enhancement fins, channels, and vortex generators in the channel areas between the fins.
Figures 12, 13:
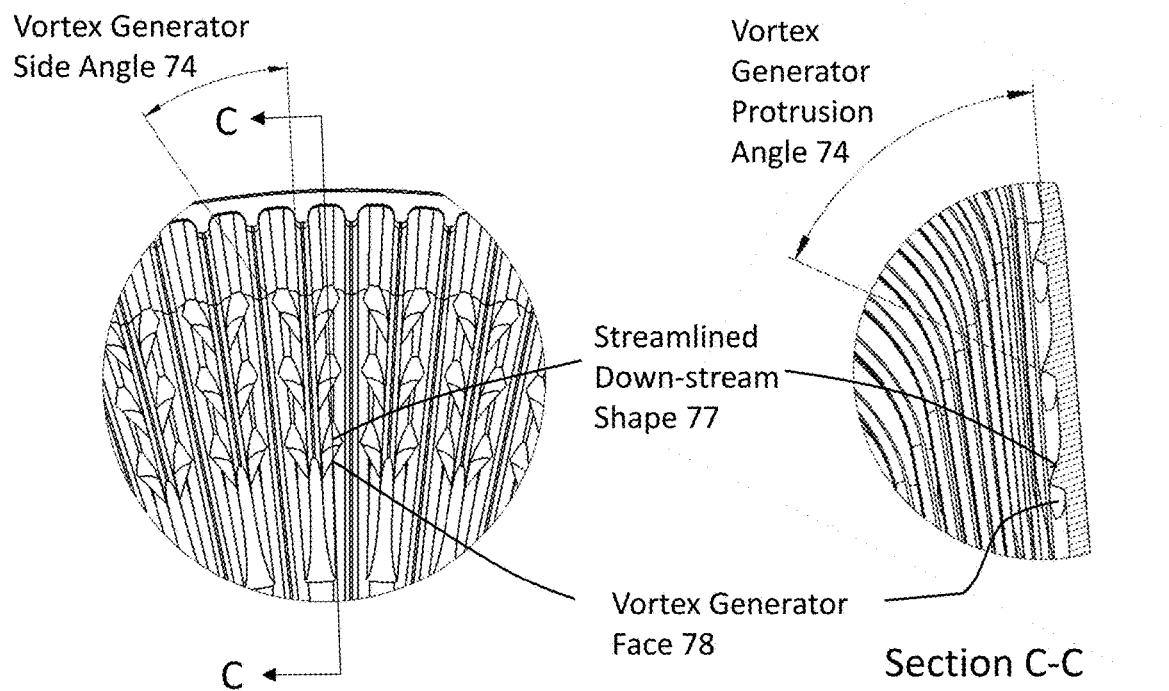
FIG. 12 is a roughly orthogonal plan view of the convection enhancement fins and vortex generators.
FIG. 13 is section C-C from FIG. 12, which cuts through the vortex generators so the protrusion angle into the flow is visible.

FIGS. 11, 12, 13 show an alternate embodiment of the upper shell 1 employing radial convection enhancement fins 76 rather than the previously disclosed curved flow guide fins 29. It should be understood that all features described in the present embodiment of the upper shell 1 would also be present in the mating lower shell 25. FIG. 11 is a partial isometric view of an inverted upper shell 1 embodiment showing radial convection enhancement fins 76 formed on the inner surface of the upper shell 1 to improve heat transfer between the hot drain water 27 and the upper shell 1 part. The fins 76 increase the surface area available for convective heat transfer from the water flow along the surface to the surface, thus improving the overall efficiency of the device. In order for these convection enhancement fins 76 to be most effective, however, they must be sized to protrude one to two millimeters from the shell surfaces 54, 43, and thereby fit within the thin film of fluid flow on the shell surface 54, 43.

The convective heat transfer can be further increased by adding vortex generators 56 within the flow channels 57 between the fins 76. Vortex generators are well known to assist in controlling boundary layers on aircraft wings, and they are also sometimes used to improve heat transfer in conventional bulk flow heat exchangers by increasing turbulence. The vortex generators 56 used in this application each define a vortex generator face 78 that protrudes into the channels 57 from surface upper conical shell 43 and at a side angle to each flow channel 57, the side angle indicated by vortex generator side angle 74 in FIG. 12. This angle 74 is ideally between twenty-five (25) and sixty-five (65) degrees.

Section C-C in FIG. 13 is cut longitudinally through the vortex generator 46 features, and shows the vortex generator protrusion angle 74 between the vortex generator face 78 and the surface upper conical shell 43 they originate from, and thus the angle into the flow stream. This angle is shown as parallel to the first axis 80 and is thus equal to ninety (90) degrees minus the upper slope angle 59. Vortex generator face 78 is formed by the casting or forming process, which needs to be accommodated in order for this part to be manufactured, so this angle may be parallel to the first axis 80 of the of the manufactured part, so the protrusion angle 74 will depend on the angle of the upper conical shell region 40, i.e. an internal cone angle of seventy (70) degrees would allow a vortex generator protrusion angle 74 of seventy (70) degrees. The vortex generators 56 also have a streamlined down-stream shape 77 such that the thin film of flow will tend to remain attached to the surface, such as surface 43 in the upper shell 1.

A portion of the upper shell 1 surface is upper conical shell surface 43 which in use is oriented to form an inverted surface, so that flow along it is similar to flow across a sloped ceiling. Therefore any excessive disturbance to the flow that encourages the flow to separate from the surface 43 and drip away will impede the efficiency of the heat recovery device 18. The angled, upstream face 78 of each vortex generator 56 imparts a rotational velocity to the flow film, which increases the convection between the flow stream and the surface 43, thus improving the performance of the disclosed heat recovery device. Any number of vortex generators 56 may be present in any or all of the flow channels 57. For the lower shell 25, the vortex generators 56 would have the opposite orientation, since the flow is towards the first axis 80 of the heat recovery device 18.

Figure 14:
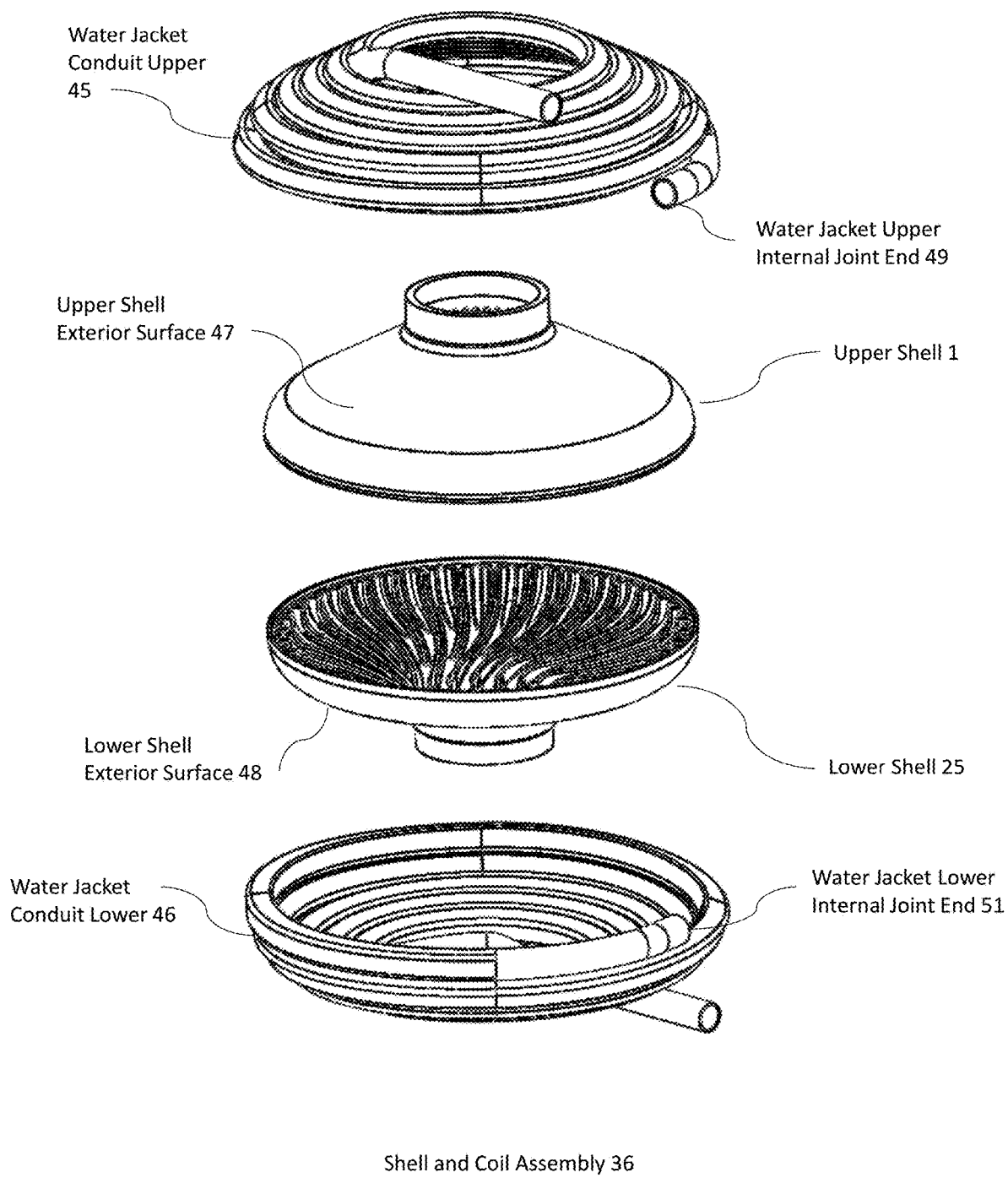
FIG.14 is an exploded isometric view assembly of the shell and coil components of the heat recovery device, showing the four (4) separate components prior to assembly and furnace brazing or soldering.

FIG. 14 is an exploded view of the heat recovery device 18, without the removable strainer 28, nozzle 5, and flow redirector 7 parts. Since of the water and thermal energy flow through all four of these components, they should made from a suitable material with respect to potable water contact, waste water contact, pressure resistance and leak requirements, corrosion resistance, and thermal conductivity. These parts are preferably made from high purity copper alloys that are over 99% copper, and preferably over 99.9% copper, such as alloys that are approved for plumbing pipe and pipe fitting applications, such as C10200, C10300, C10800, C12000, C12200, which all have a purity of at least 99.9% copper, and thermal conductivities approaching 400 Watts per meter Kelvin. The upper shell 1 and lower shell 25 can be manufactured using a casting process, or preferably, a forming or forging process, which can provide finer and more accurate surface details, and importantly, thinner walls, which would lower cost and improve heat transfer efficiency. The cold water jacket conduit 2, which may consist of two parts, a water jacket conduit upper 45 and a water jacket lower conduit 46, may be manufactured from extruded commercial pipe coil stock, and formed to the required coil shape, e.g., using a CNC coil forming machine. The cold water jacket conduit 2 coil may be manufactured in two pieces, to be later joined at the final assembly, in order to facilitate the assembly process. The upper and lower shell components 1, 25 may be first joined together with the addition of a brazing or soldering paste at the interface. The cold water jacket conduit coils 45, 46 may then be assembled and joined with a brazing or solder paste or sheet at the interface between the cold water jacket conduit coils 45, 46 and the shell parts 1, 25, and also at the water jacket upper and lower internal joint ends 49, 51 where the coils join together to form the cold water jacket conduit 2. The shell and coil assembly 36, including the upper shell 1, lower shell 25, and water jacket conduits upper and lower 45, 46 would then be furnaced brazed, for example, in a vacuum or inert gas furnace, to join the four (4) copper parts 1, 25, 45, 46 into one continuous copper and copper alloy assembly. Optionally, the shell and coil assembly 36 may be held together tightly in a jig while being furnace brazed, in order to ensure maximum thermal and physical contact between all components.

Figure 15:
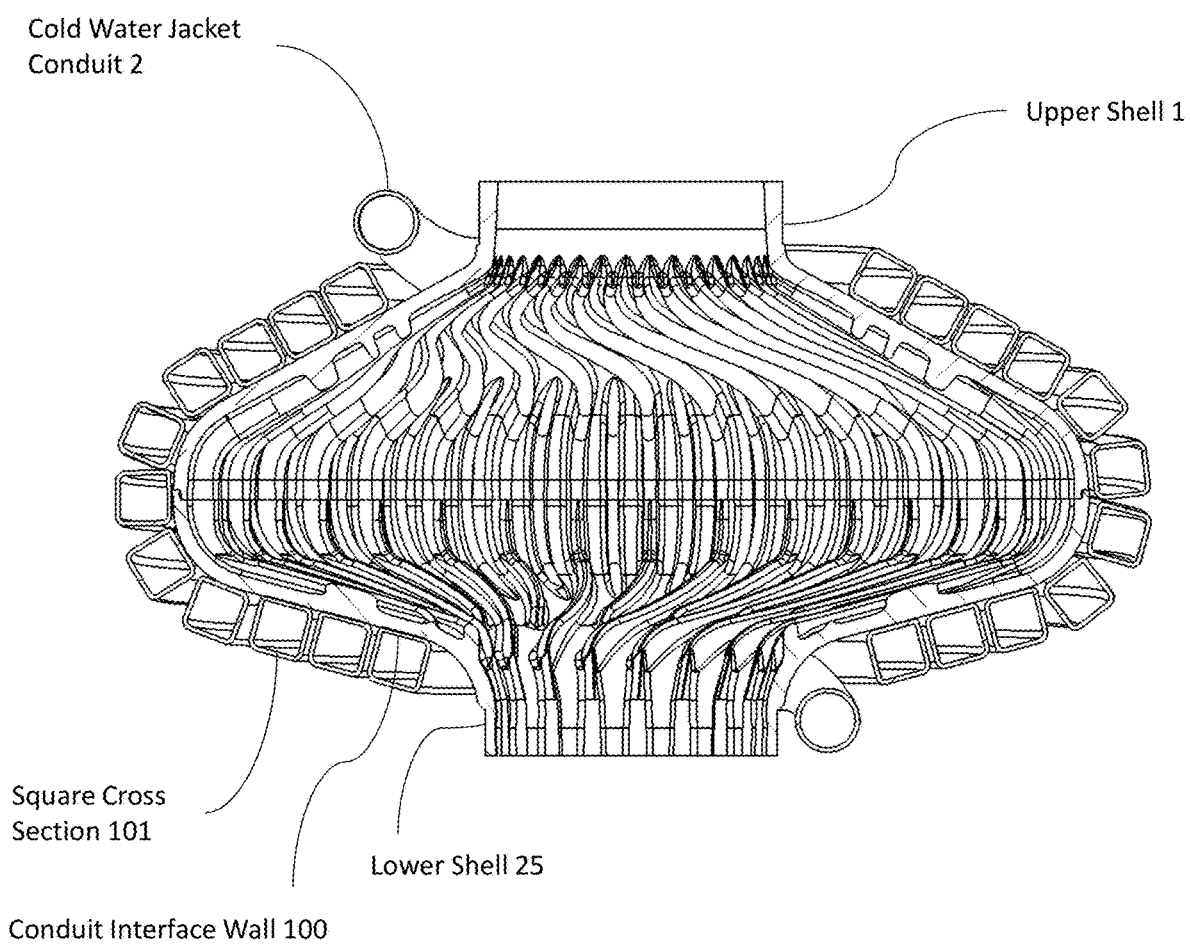
FIG. 15 is a cross section of the heat recovery device showing a configuration using squared cross section tubing for the cold water jacket conduit.

Turning to FIG. 15, a section view of an alternate embodiment of the shell and coil assembly 36 with a square section cold water jacket conduit 2 is shown. By modifying the cold water jacker conduit 2 to have a square or rectilinear cross section 31, rather than circular, the heat transfer efficiency of the heat recovery device 18 can be increased, which is desirable because it would improve the energy savings of the heat recovery device 18, and improve the economic payback for customers. For example, a square cross section 31 tube has a higher convection coefficient than a conduit with a circular cross section 99 (FIG. 6), and may also have an increased interface area with the shell assembly 9 for further improvements in heat recovery performance. Further varying the cross section to be rectangular rather than square, with the shorter side defining a conduit interface wall 100 against the shell assembly 9, may further increase the convection coefficient of the cold water jacket conduit 2, and may thus increase the convective heat transfer rate to the cold water, and thus improve the overall efficiency of the heat recovery device, and increase its energy saving value.

Figure 16:
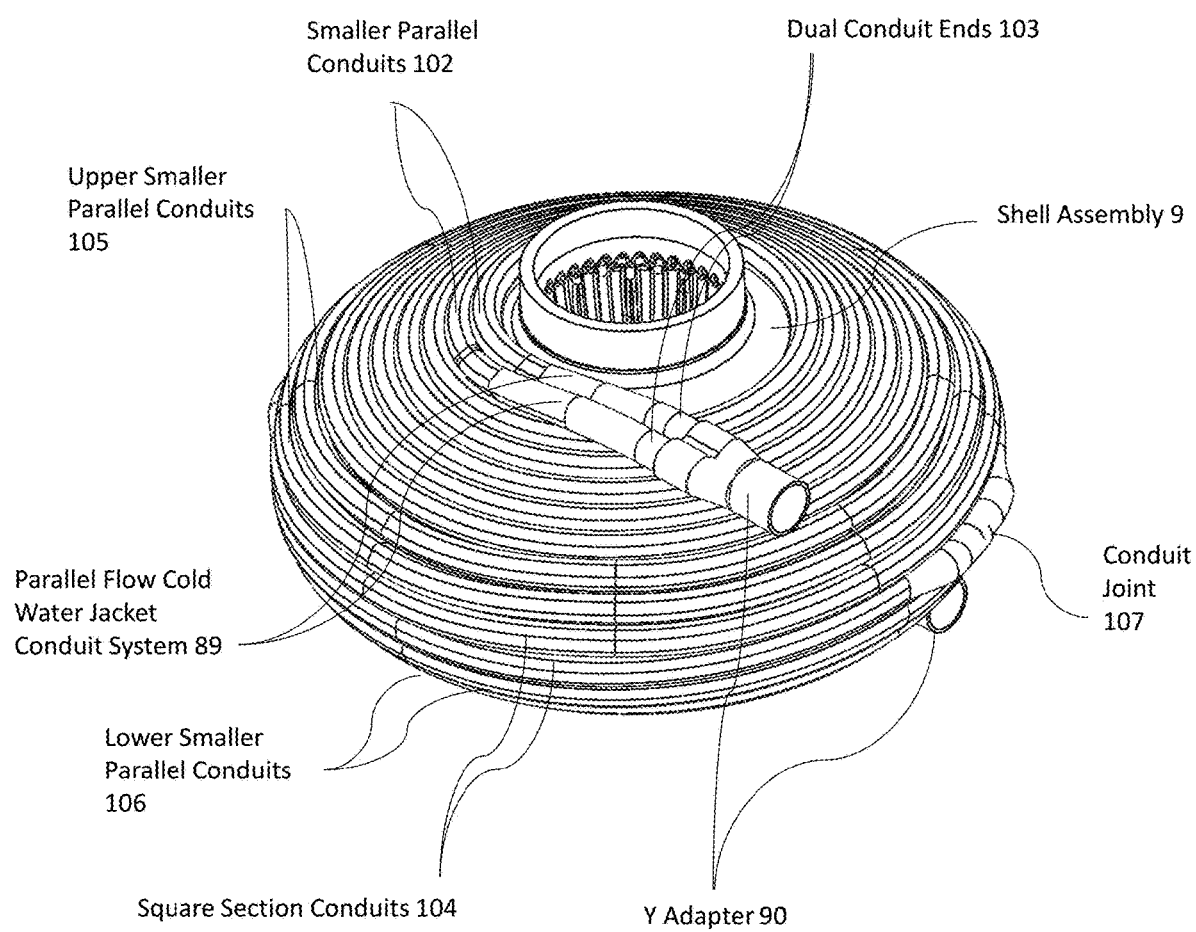
FIG. 16 is an alternate embodiment of the shell and coil assembly that has a dual, parallel flow cold water jacket conduit system.

An alternate embodiment of the cold water jacket conduit 2, or second conduit, is disclosed in FIG. 16. A dual parallel flow cold water jacket second conduit system 89 is shown, which is an alternative system for a second conduit. This parallel flow cold water jacket conduit system 89 will have an improved overall heat transfer coefficient than the previously disclosed single conduit cold water jacket 2 second conduit (FIG. 4), since smaller diameter conduits 102 can be used, which will have an improved convective heat transfer performance from the internal walls of the smaller conduits 102 to the internal flow of cold water from cold water supply C, while avoiding the increased pressure drop that would disqualify this system if the smaller conduit 102 was a single, much longer conduit, which would be required to cover upper shell exterior surface 47 and lower shell exterior surface 48. The parallel flow cold water jacket conduit system 89 is shown with "Y" adapters 90 joining each of dual conduit ends 103 into a single conduit, to ensure an even cold water flow distribution between the pair of otherwise separate smaller conduits 102. Parallel flow cold water jacket conduit system 89 is shown with square section conduits 104, which will further improve heat transfer from the cold water flowing from the cold water source C through the parallel flow cold water jacket conduit system 89 and also between the parallel flow cold water jacket conduit system 89 and the shell assembly 9. A parallel flow cold water jacket conduit system 89 could also be implemented with circular cross section conduits (not shown), or with more than two conduits plumbed in parallel (not shown). Each smaller conduit 102 of the parallel flow cold water jacket conduit system 89 may be split, for improved manufacturability, into an upper smaller parallel conduit 105 and a lower smaller parallel conduit 106, joined in series at conduit joint 107 during the heat recovery device 18 assembly process.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A fluid to fluid heat exchanger system comprising:
   a first conduit that extends from a first conduit top end along a first axis to a first conduit bottom end to define a first conduit length, the first conduit defining:
   an entrance region that extends along the first axis from the first conduit top end to an entrance region bottom end, wherein the entrance region defines a cylindrical shape having a first conduit entrance diameter, wherein the entrance region is configured to receive a first fluid flow substantially parallel to the first axis, into the heat exchanger system;
   a central region, extending axially downward along the first axis from the entrance region bottom end, wherein the central region defines:
   a central region top end at the entrance region bottom end;
   a central region diverging portion that extends axially downwardly, along the first axis and conically diverges from the central region top end to a central region intermediate portion,
   wherein the central region intermediate portion defines a first conduit central region diameter that is greater than the first conduit entry diameter; and
   a central region converging portion that extends axially downwardly along the first axis and conically converges from the central region intermediate portion end to a central region bottom end, the central region bottom end defining a first conduit exit diameter that is less than the first conduit central diameter;
   an exit region that extends along the first axis from the central region bottom end to the first conduit bottom end, wherein the exit region defines a cylindrical shape having the first conduit exit diameter;
   a second conduit defining a second conduit diameter that is smaller than the first conduit entrance diameter, and a second conduit length that is longer than the first conduit length, wherein the second conduit is helically wrapped about the first conduit central region, from the central region top end to the central region bottom end, wherein the second conduit contacts the first contact substantially continuously along its length, thereby being in continuous and direct thermal contact with the first conduit.

2. The system of claim 1, wherein the first conduit entrance diameter is substantially the same as the first conduit exit diameter.

3. The system of claim 1, wherein first conduit central diameter is between two and seven times the first conduit entrance diameter.

4. The system of claim 3, wherein:
   the first conduit central diameter is ten to forty times greater than the second conduit diameter.

5. The system of claim 3, wherein:
   the second conduit length is ten to fifty times greater than the first conduit length.

6. The system of claim 1, comprising:
   a flow redirector located inside the entrance region of the first conduit,
   the flow director defining an axisymmetric shape,
   the flow director axis of symmetry colinear with the first axis,
   the flow redirector defining an upper top surface and lower outer edge, the upper top surface defining a convex or conical shape diverging downwards, the lower outer edge defining the outer perimeter of a region of concave surface extending upwards to the upper top surface, the flow redirector concave surface and outer edge defining an outer edge tangent angle, the tangent angle defining an angle within 30 degrees of horizontal relative the first axis, a gap is formed between the lower outer edge of said flow redirector and the entrance portion of the first conduit to define a flowpath therebetween; and an outside diameter of said flow redirector being smaller than an internal diameter of the entrance region of the first conduit.

7. The system of claim 6, comprising:
a nozzle located above said flow redirector that has a substantially cylindrical geometry at a lower edge of the nozzle, the nozzle located substantially coaxially with said first conduit and said flow redirector, and configured for being removable from the heat exchanger by biasing along the first axis away from the bottom end of the first conduit.

8. A shower system comprising:
a shower or bathtub, a drain including the system of claim 1, wherein, in operation, the first fluid is drain water and flows substantially into the first conduit, and the second fluid is water that is colder than the first fluid and that flows through the second conduit to a shower mixing valve of the showers system.

9. The system of claim 1, comprising:
rib structures formed on an internal surface of the first conduit that protrude inwardly towards the first axis from said wall such that in operation the rib structures engage the drain water flowing through the first conduit, the rib structures defining flow channels therebetween.

10. The system of claim 1, comprising:
ribs structures formed on an internal wall of the first conduit that protrude inwardly towards the first axis, by less than 3 mm from said internal wall to define a height of the ribs, the rib structures defining flow channels therebetween.

11. The system of claim 9, comprising:
vortex generator features, comprising a protruding feature extending toward the first axis, thereby into the flow stream in operation, from said internal surfaces of the first conduit; having a substantially planer upstream face that is parallel to the first axis of the first conduit; at a 20 to 70 degree angle relative to a radial axis of the first conduit, along said internal surface; said vortex generator protruding from said channel a distance substantially equal to the height of the ribs, and are one or more are disposed in one or more of the flow channels defined between said ribs.

12. The system of claim 10, comprising:
vortex generator features, comprising a protruding feature extending toward the first axis, thereby into the flow stream in operation, from said internal surfaces of the first conduit; having a substantially flat upstream face that is parallel to the first axis of the first conduit; at a 20 to 70 degree angle relative to a radial axis of the first conduit, along said internal surface; said vortex generator protruding from said channel a distance substantially equal to the height of the ribs, and are one or more are disposed in one or more of the flow channels defined between said ribs.

13. The system of claim 1 where the first and second conduit are joined by brazing or soldering.

14. A fluid to fluid heat exchanger system comprising:
a first conduit that extends from a first conduit top end along a first axis to a first conduit bottom end to define a first conduit length, the first conduit defining:
an entrance region that extends along the first axis from the first conduit top end to an entrance region bottom end, wherein the entrance region defines a cylindrical shape having a first conduit entrance diameter, wherein the entrance region is configured to receive a first fluid flow substantially parallel to the first axis, into the heat exchanger system;
a central region, extending axially downward along the first axis from the entrance region bottom end, wherein the central region defines:
a central region top end at the entrance region bottom end;
a central region diverging portion that extends axially downwardly, along the first axis and conically diverges from the central region top end to a central region intermediate portion,
wherein the central region intermediate portion defines a first conduit central region diameter that is greater than the first conduit entry diameter; and
a central region converging portion that extends axially downwardly along the first axis and conically converges from the central region intermediate portion end to a central region bottom end, the central region bottom end defining a first conduit exit diameter that is less than the first conduit central diameter;
an exit region that extends along the first axis from the central region bottom end to the first conduit bottom end, wherein the exit region defines a cylindrical shape having the first conduit exit diameter;
a second conduit system defining a second conduit diameter that is smaller than the first conduit entrance diameter, and a second conduit length that is longer than the first conduit length, wherein the second conduit is helically wrapped about the first conduit central region, from the central region top end to the central region bottom end, wherein the second conduit contacts the first contact substantially continuously along its length, thereby being in continuous and direct thermal contact with the first conduit, the second conduit system having two or more conduits arranged in parallel.

15. The system of claim 14, wherein the first conduit entrance diameter is substantially the same as the first conduit exit diameter.

16. The system of claim 14, wherein first conduit central diameter is between two and seven times the first conduit entrance diameter.

17. The system of claim 16, wherein:
the first conduit central diameter is ten to eighty times greater than the second conduit diameter.

18. The system of claim 16, wherein:
the second conduit length is ten to fifty times greater than the first conduit length.

* * * * *